A. WILKINSON.
SPRING SEAT PARTICULARLY APPLICABLE TO MOTOR CARS AND OTHER CARRIAGES.
APPLICATION FILED SEPT. 13, 1915.

1,203,293.

Patented Oct. 31, 1916.

Inventor:-
Alfred Wilkinson
by attorneys

UNITED STATES PATENT OFFICE.

ALFRED WILKINSON, OF ILKLEY, ENGLAND.

SPRING-SEAT PARTICULARLY APPLICABLE TO MOTOR-CARS AND OTHER CARRIAGES.

1,203,293.     Specification of Letters Patent.     Patented Oct. 31, 1916.

Application filed September 13, 1915. Serial No. 50,536.

*To all whom it may concern:*

Be it known that I, ALFRED WILKINSON, a subject of the King of Great Britain, and resident of Brook street, Ilkley, Yorkshire, England, garage proprietor, have invented new and useful Improvements in Spring-Seats Particularly Applicable to Motor-Cars and other Carriages, of which the following is a specification.

The seat which forms the subject of the present application is of the suspension or hammock type, a common example of which is the deck chair comprising a top back rail and a front bottom rail with flexible material slung between. The flexible material whether canvas, tapes, wires or coiled springs adjustably attached to the rails, is of one degree of flexibility throughout its whole length and is unable to give support to the sitter except by reason of the tension put upon the seat by his weight.

According to the present invention the hammock seat is improved and made suitable for the seat of a motor car or the like, by employing side by side spring laths which have a permanent set or shape in profile and possess individual stiffness as compared with their means of attachment by which they are flexibly suspended from the top and bottom rails. In this way the general character of the hammock seat is retained while the spring laths by possessing some stiffness and permanent set, give a support to the sitter in the hollow of the back or in any place that may be determined when the spring laths are shaped.

Although my improved seat is particularly suitable for use in motor cars and other carriages, it is also applicable for other uses. The seat is light and comfortable and the spring laths may be quickly and cheaply removed and replaced when broken or strained after the manner of other separate spring strips used in the manufacture of chairs and the like.

In the accompanying drawing I have shown a portion of a seat constructed according to my invention.

$a$ and $b$ are rails which form part of a seat structure.

Figure 1:
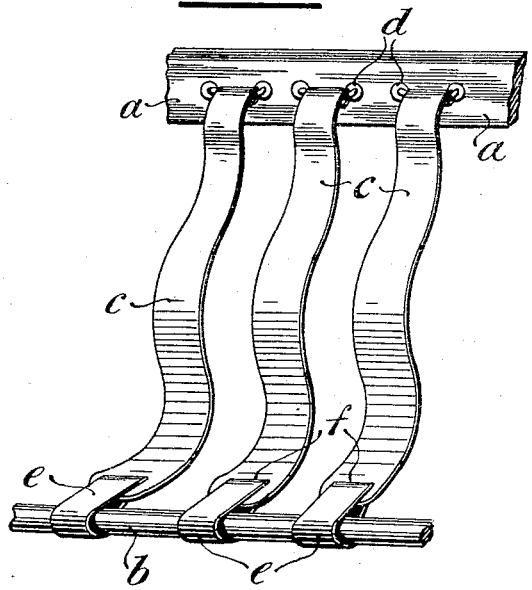
Figure 1 shows in perspective three metal springs attached to top and bottom rails.
Figure 2:
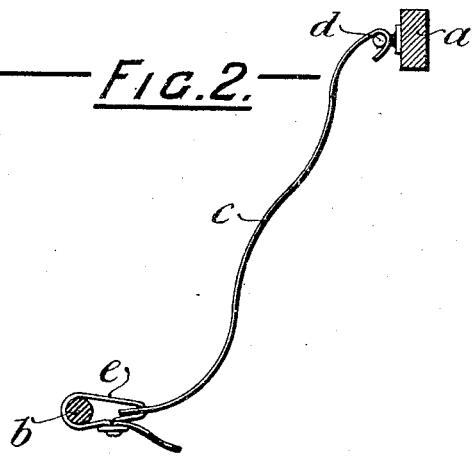
Fig. 2 is a side view of a spring and its means of support, the rails being in section.

$c$ are spring strips or laths preferably of steel curved more or less to the shape seen in Fig. 2 and so tempered as to retain some of their curvature even under the weight of the sitter. These spring strips $c$ are hooked on to staples $d$ fixed to the rail $a$ and they are attached flexibly by straps $e$ passing through slots $f$ to the rail $b$. This mode of attachment is convenient as it provides among other advantages for the easy adjustment of the inclination of the springs by lengthening or shortening the straps by means of the buckles.

No cushion or upholstery is shown covering the springs but such can be furnished without difficulty and no description is therefore needed in this connection.

The framework of the seat will vary according to requirements or to the uses to which the seat is to be put. It is thought quite sufficient to provide in the drawing merely a top and bottom rail for the attachment of the springs by way of example.

The elasticity of the springs will enable them to conform agreeably to the back of the occupant of the seat; and yet they are sufficiently stiff to give support which is not to be obtained from material which is entirely flexible as in an ordinary hammock chair.

What I claim and desire to secure by Letters Patent of the United States is:—

A seat having in combination a top rail and a bottom rail, a number of parallel spring laths having a permanent shape in profile, loose connections between the laths and the top rail, and flexible attachments adjustable in length between the laths and the bottom rail.

In testimony whereof I have signed my name to this specification.

ALFRED WILKINSON.

Witnesses:
   H. SYKES,
   ARTHUR TURNER.

Copies of this patent may be obtained for five cents each, by addressing the "Commissioner of Patents, Washington, D. C."